United States Patent
Park et al.

(10) Patent No.: US 10,025,160 B2
(45) Date of Patent: Jul. 17, 2018

(54) BACKLIGHT UNIT AND 3D IMAGE DISPLAY APPARATUS

(71) Applicant: SAMSUNG ELECTRONICS CO., LTD., Suwon-si (KR)

(72) Inventors: Joonyong Park, Suwon-si (KR); Dongouk Kim, Pyeongtaek-si (KR); Hyunjoon Kim, Seoul (KR); Jihyun Bae, Seoul (KR); Alexander V. Morozov, Moscow area (RU); Bongsu Shin, Seoul (KR); Sunghoon Lee, Seoul (KR); Changsoo Lee, Seoul (KR); Jaeseung Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

(21) Appl. No.: 15/213,792

(22) Filed: Jul. 19, 2016

(65) Prior Publication Data
US 2017/0059961 A1 Mar. 2, 2017

(30) Foreign Application Priority Data
Aug. 26, 2015 (KR) .................. 10-2015-0120548

(51) Int. Cl.
*H04N 13/00* (2018.01)
*G02B 27/22* (2018.01)
(Continued)

(52) U.S. Cl.
CPC .................. *G02F 1/31* (2013.01); *G02B 3/12* (2013.01); *G02B 6/003* (2013.01); *G02B 6/0051* (2013.01);
(Continued)

(58) Field of Classification Search
CPC ......... G02F 1/1334; G02F 1/136; G02B 3/12; G02B 6/0068; G02B 27/22
(Continued)

(56) References Cited

U.S. PATENT DOCUMENTS

2009/0067156 A1   3/2009  Bonnett et al.
2011/0043909 A1   2/2011  Miyawaki et al.
(Continued)

FOREIGN PATENT DOCUMENTS

EP           2736257 A1    5/2014
KR  10-2012-0131561 A     12/2012
(Continued)

OTHER PUBLICATIONS

Communication dated Jan. 25, 2017 issued by the European Patent Office in counterpart European Patent Application No. 16182445.3.
(Continued)

*Primary Examiner* — Toan Ly
(74) *Attorney, Agent, or Firm* — Sughrue Mion, PLLC

(57) ABSTRACT

Provided are a lighting system, a backlight unit and a 3D image display apparatus including the backlight unit. The backlight unit includes: a lighting system configured to selectively output collimated light and diverging light, a diffraction device, and a light guide plate configured to guide the collimated light and the diverging light from the lighting system to the diffraction device. An exit direction of the collimated light from the diffraction device depends on at least one of an angle of incidence of the collimated light and the wavelength of the collimated light.

43 Claims, 14 Drawing Sheets

(51) Int. Cl.
  *G02B 3/12* (2006.01)
  *G02F 1/136* (2006.01)
  *G02F 1/1334* (2006.01)
  *F21V 8/00* (2006.01)
  *G02F 1/31* (2006.01)
  *G02F 1/1335* (2006.01)
  *G02F 1/29* (2006.01)

(52) U.S. Cl.
  CPC .......... *G02B 6/0068* (2013.01); *G02B 27/22* (2013.01); *G02F 1/136* (2013.01); *G02F 1/1334* (2013.01); *G02F 1/133621* (2013.01); *G02F 1/29* (2013.01); *H04N 13/00* (2013.01)

(58) Field of Classification Search
  USPC .......................................................... 362/606
  See application file for complete search history.

(56) References Cited

U.S. PATENT DOCUMENTS

| | | | |
|---|---|---|---|
| 2011/0317399 A1* | 12/2011 | Hsu | G02F 1/1323 362/97.1 |
| 2012/0008067 A1 | 1/2012 | Mun et al. | |
| 2012/0299808 A1* | 11/2012 | Lee | G02B 5/32 345/102 |
| 2013/0141937 A1 | 6/2013 | Katsuta et al. | |
| 2013/0307831 A1 | 11/2013 | Robinson et al. | |
| 2013/0321899 A1 | 12/2013 | Haussler | |
| 2014/0036529 A1 | 2/2014 | Suzuki et al. | |

FOREIGN PATENT DOCUMENTS

| | | |
|---|---|---|
| KR | 10-2014-0147923 A | 12/2014 |
| KR | 10-2015-0021937 A | 3/2015 |
| WO | 2014/064228 A1 | 5/2014 |

OTHER PUBLICATIONS

Huang et al., "Autostereoscopic 3D Display with Scanning Multi-electrode Driven Liquid Crystal (MeD-LC) Lens", 3DR Review, Oct. 10, 2009, 2 pages total, 3D Research Center and Springer 2010.
Toda et al., "3D video system using Grating Image", SPIE, Jun. 11, 2014, 8 pages total, vol. 2406, Japan, http://proceedings.spiedigitallibrary.org/.
Communication dated Dec. 15, 2017, issued by the European Patent Office in counterpart European Application No. 16182445.3.

* cited by examiner

< 3D MODE >

< 2D MODE >

BACKLIGHT UNIT AND 3D IMAGE DISPLAY APPARATUS

CROSS-REFERENCE TO RELATED APPLICATION

This application claims the benefit of Korean Patent Application No. 10-2015-0120548, filed on Aug. 26, 2015, in the Korean Intellectual Property Office, the disclosure of which is incorporated herein in its entirety by reference.

BACKGROUND

1. Field

Apparatuses consistent with exemplary embodiments relate to a lighting system, a backlight unit capable of switching between a 2D image display mode and a 3D image display mode and an image display apparatus including the backlight unit.

2. Description of the Related Art

Along with the popularity of three-dimensional (3D) movies, many different technologies related for 3D image display apparatuses have been researched. 3D image display apparatuses display 3D images based on binocular parallax. Currently commercialized binocular-parallax 3D image display apparatuses are configured to display 3D images by providing left-eye and right-eye images having different viewpoints to the left and right eyes of viewers. Such 3D image display apparatuses may be classified as glasses-type 3D image display apparatuses requiring special glasses or as non-glasses-type 3D image display apparatuses which do not require special glasses.

Examples of glasses-type 3D image display apparatuses include red-green glasses type 3D image display apparatuses, commonly used in movie theaters, and polarizing glasses or liquid crystal shutter glasses type 3D image display apparatuses, commonly used in conjunction with televisions (TVs). Non-glasses-type 3D image display apparatuses may be classified, according to the structures thereof, as barrier-type 3D image display apparatuses, lenticular-type 3D image display apparatuses, etc. In addition, non-glasses-type 3D image display apparatuses may be classified, according to image forming methods, as multi-view rendering 3D image display apparatuses, volumetric 3D image display apparatuses configured to contain all 3D space information and display the 3D information in a 3D space using voxels, integral imaging 3D image display apparatuses configured to capture images at multiple angles using lenses shaped like compound eyes of insects (fly's eyes) and inversely display the images, holographic 3D image display apparatuses, etc.

SUMMARY

One or more exemplary embodiments may provide a lighting system and a backlight unit capable of switching between a 2D image display mode and a 3D image display mode.

One or more exemplary embodiments may provide a 3D image display apparatus including a backlight unit capable of switching between a 2D image display mode and a 3D image display mode.

Additional exemplary aspects and advantages will be set forth in part in the description which follows and, in part, will be apparent from the description, or may be learned by practice of the presented exemplary embodiments.

According to an aspect of an exemplary embodiment, a lighting system includes: light sources configured to emit one or both of diverging light and collimated light, and optical switches configured to selectively output diverging light and collimated light.

At least some of the light sources may be configured to emit diverging light and the lighting system further comprises collimators configured to change the diverging light emitted from the light sources into collimated light.

The light sources may be light emitting diodes.

The collimators may include a lens.

The collimators may include a liquid crystal.

The collimator may include an eletrowetting device.

The optical switches may include an actuator configured to move the collimator to and away from an optical axis of the light source.

At least some of the light sources may be configured to emit collimated light and the lighting system further comprises scatterers configured to change the collimated light emitted from the light sources into diverging light.

The light sources may be a laser diode.

The scatterers may include a polymer dispersed liquid crystal.

The optical switches may include an actuator configured to move the scatterer to and away from an optical axis of the light source.

The light sources may include first light sources configured to emit the diverging light and second light sources configured to emit the collimated light.

The first light sources may be light emitting diodes and the second light sources are laser diodes.

The first and second light sources may be alternately arranged.

The optical switches may be configured to perform on-off control operation on the first and second light sources.

According to an aspect of another exemplary embodiment, a backlight unit includes: a lighting system configured to selectively output collimated light and diverging light, a diffraction device; and a light guide plate configured to guide the collimated light and the diverging light from the lighting system to the diffraction device.

The lighting system may be positioned lateral to a side of the light guide plate.

The collimated light may be one of blue, red, and green light and the diverging light is white light.

The backlight unit may include a plurality of the lighting systems each being positioned lateral to a different side surface of the light guide plate.

The collimated light selectively outputted from the lighting systems may be include red collimated light, green collimated light, and blue collimated light.

The collimated light selectively outputted from two of the plurality of lighting system may be the green collimated light.

The diverging light selectively outputted from each of the lighting system is white light.

According to an aspect of another exemplary embodiment, a 3D image display apparatus includes: a lighting system configured to selectively output collimated light and diverging light, a light guide plate configured to guide the collimated light and the diverging light from the lighting system, a diffraction device configured to transmit the diverging light incident thereon from the light guide plate and to transmit the collimated light incident thereon from the light guide plate in an exit direction, the exit direction being depend on at least one of a wavelength and an angle of incidence of the collimated light from the light guide plate, and a display panel configured to form images using the light transmitted from the diffraction device.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
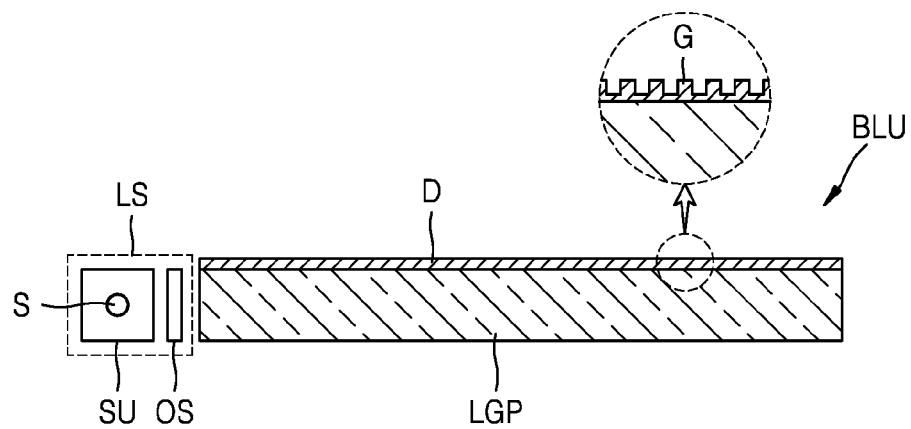
FIG. 1 schematically illustrates a backlight unit according to an exemplary embodiment.

Reference will now be made in detail to exemplary embodiments which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present inventive concept. As used herein, the term "and/or" includes any and all combinations of one or more of the associated listed items. Expressions such as "at least one of," when preceding a list of elements, modify the entire list of elements and do not modify the individual elements of the list.

Hereinafter, lighting systems, backlight units and 3D image display apparatuses including the backlight units will be described according to exemplary embodiments with reference to the accompanying drawings. In the drawings, the size of each element may be exaggerated for clarity of illustration. It will be understood that although the terms "first", "second", etc. may be used herein to describe various components, these components should not be limited by these terms. These terms are only used to distinguish one element from another.

As used herein, the singular forms "a," "an" and "the" are intended to include the plural forms as well, unless the context clearly indicates otherwise. It will be further understood that the terms "comprises," "comprising," "includes," and/or "including" used herein specify the presence of stated features or elements, but do not preclude the presence or addition of one or more other features or elements.

In the present disclosure, terms such as units or modules are used to denote a unit having at least one function or performing at least one operation and implemented with hardware, software, or a combination of hardware and software, for example, a combination of a hardware processor and a memory storing software instructions which enable the hardware processor to implement the various units or modules. In addition, expressions such as "A is provided on B" may be construed to mean that A is provided to B in a contact or non-contact manner.

FIG. 1 schematically illustrates a backlight unit BLU according to an exemplary embodiment. The backlight unit BLU includes a lighting system LS emitting light, a light guide plate LGP guiding light emitted from the lighting system LS, and a diffraction device D provided on the light guide plate LGP.

Figure 2:
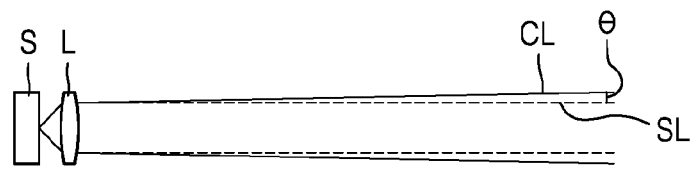
FIG. 2 illustrates an angle of collimated light in the backlight unit according to an exemplary embodiment.

The lighting system LS may include a light source unit SU configured to emit at least one of collimated light and diverging light, and an optical switch OS configured to selectively transmit the collimated light or the diverging light. The term "collimated light" refers to light whose rays are parallel. It should be understood, however, that, in reality, perfect collimated light with no divergence may not be possible. Therefore, as discussed herein, "collimated light" may angularly disperse within a diverging angle θ, as shown in FIG. 2. For example, collimated light CL may disperse over an angle θ of about 5° or less with respect to ideal light with perfectly parallel rays SL. In another example, collimated light CL may disperse over an angle θ of about 4° or less. In another example, collimated light CL may disperse over an angle θ of about 3° or less.

The light source unit SU may include at least one light source S. The light source S may emit collimated light, or light emitted from the light source S may be collimated. For example, if the light source S is a laser diode (LD), the light source S may emit collimated light. In another example, the light source S may emit diverging light, or light emitted from the light source S may be scattered or diffused to obtain diverging light. For example, if the light source S is a light emitting diode (LED), the light source S may emit diverging light.

The optical switch OS may selectively transmit collimated light or diverging light toward the light guide plate LGP (On-off control). The on-off control for transmitting collimated light or diverging light may be performed by a mechanical control method or an electric control method. A control method related to the optical switch OS will be described in further detail below.

The light guide plate LGP may guide light emitted from the lighting system LS while totally internally reflecting the light and may output the light through an upper side of the light guide plate LGP.

Figure 22:
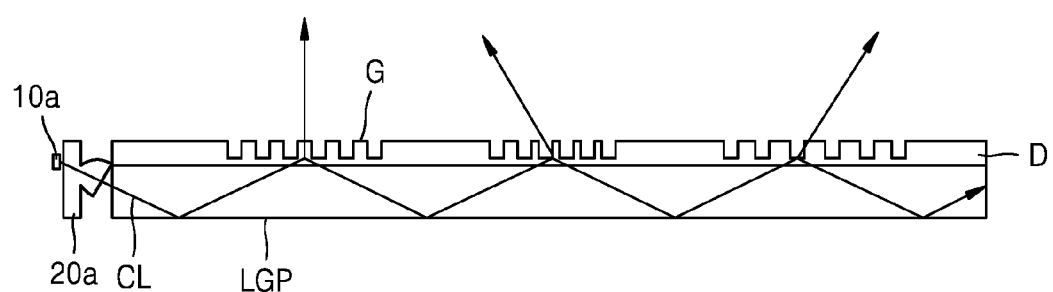
FIG. 22 illustrates an exemplary path of collimated light within a light guide plate and grating.

The diffraction device D may adjust the exit direction of collimated light according to at least one of the angle of incidence of the collimated light on the light guide plate LGP and the wavelength of the collimated light. For example, the angle of incidence of light to the light guide plate LGP may correspond to an exit direction in which the light exits the light guide plate LGP. For example, as shown in FIG. 22, the diffraction device D may include a plurality of grating G patterns each corresponding to the direction of collimated light CL incident on the diffraction device D from the light guide plate LGP and/or the wavelength of the light. Collimated light CL having a particular wavelength may interact with a grating G of the diffraction device D, and a portion of the light may exit the diffraction device D in a particular direction according to the combination of the pitch of the grating G and the angle of the grating G relative to the propagation direction of the light. For example, a grating may have an index of refraction of n=1.46, with a grating pattern with a height of 100 nm and a grating pitch of 380 nm, 400 nm, or 420 nm, for use with light having a wavelength of 520 nm.

Figure 23:
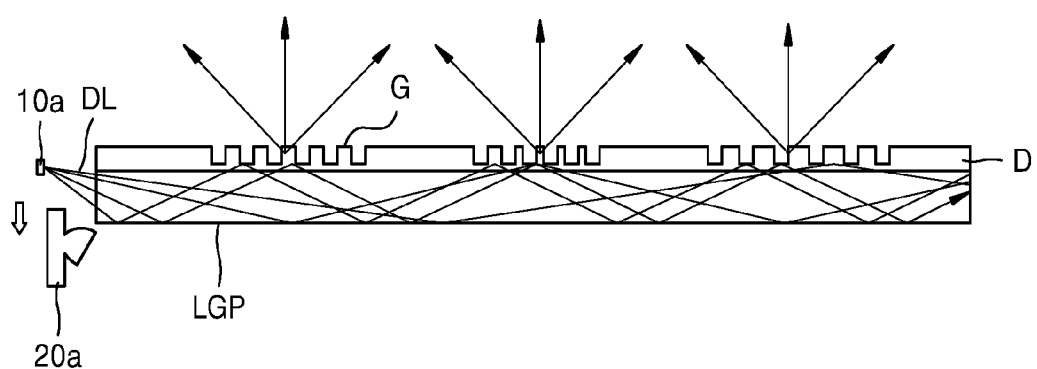
FIG. 23 illustrates an exemplary path of diverging light within a light guide plate and grating.

For example, the diffraction device D may include a plurality of regions and grating patterns respectively corresponding to the regions, and light may exit from the diffraction device D in different directions according to the grating patterns. Light exiting in different directions may provide different views, and thus 3D images may be displayed. Here, the term "view" may refer to an image provided to one eye of a viewer. The diffraction device D may control the exit direction of collimated light CL but may transmit diverging light without controlling the direction of the diverging light. For example, diverging light DL may pass through the diffraction device D intact and be diffused, as shown in FIG. 23. If the direction of light exiting from the diffraction device D is controlled to provide different views, 3D images may be displayed, and if the direction of light exiting from the diffraction device D is not controlled, 2D images may be displayed. In this manner, 2D images or 3D images may be selectively displayed using a single light guide plate.

The light guide plate LGP and the diffraction device D may be manufactured separately and may then be combined. The diffraction grating device D may be formed of a material having the same or similar refractive index as that of the light guide plate. Alternatively, the light guide plate LGP and the diffraction device D may be manufactured as one piece—i.e. a single element. For example, a diffraction grating may be formed on a side of the light guide plate LGP as the diffraction device D. For example, the diffraction grating may be formed by a nano-imprinting lithography method or an etching method. However, the diffraction grating may be formed by any of various methods.

Figure 3:
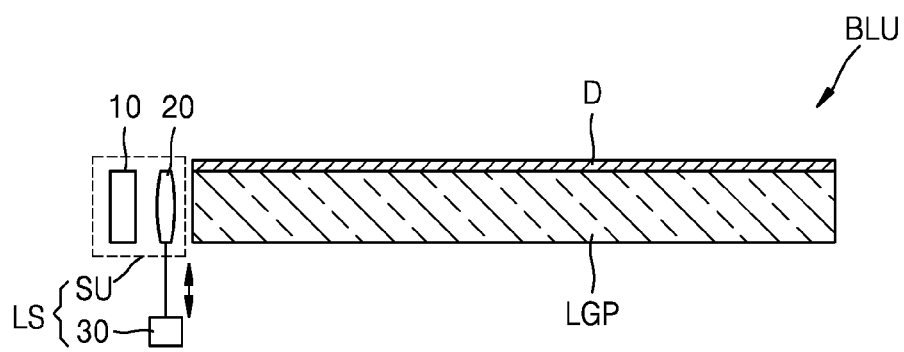
FIG. 3 illustrates an example in which a collimator of the backlight unit includes a lens according to an exemplary embodiment.

FIG. 3 illustrates an example of the backlight unit BLU. Referring to FIG. 3, the light source unit SU may include a light source 10 and a collimator 20. For example, the light source 10 may emit diverging light. For example, the light source 10 may include an LED. The collimator 20 may collimate light emitted from the light source 10. For example, the collimator 20 may include at least one collimating lens. For example, the collimating lens may include a convex lens, a combination of convex lenses, a fly eye lens, or a lens having a special structure.

The backlight unit BLU illustrated in FIG. 3 may include an actuator 30 capable of moving the collimator 20 and functioning as an optical switch. In the exemplary embodiment illustrated in FIG. 3, the collimator 20 may be moved by a mechanical driving method, thereby selecting collimated light or diverging light (on-off control). The actuator 30 may move the collimator 20 to align the collimator 20 with an optical axis of the light source 10 or place the collimator 20 away from the optical axis. The actuator 30 may operate as an optical switch as follows. If the actuator 30 moves the collimator 20 away from the optical axis, light emitted from the light source 10 diverges on its path toward the light guide plate LGP without being collimated. In this case, the collimator 20 is moved away from the optical axis to an extent such that the collimator 20 does not interfere with light emitted from the light source 10. Light which diverges on its path to the light guide plate LGP may be incident on the diffraction device D after being totally internally reflected, at least by the lower surface of the light guide plate LGP, and the diffraction device D may output the light without diffracting the light.

If the actuator 30 aligns the collimator 20 with the optical axis, light emitted from the light source 10 is collimated by the collimator 20, and thus the collimated light is incident on the light guide plate LGP. In the light guide plate LGP, the collimated light may be totally internally reflected at least by the lower surface of the light guide plate LGP, and incident on the diffraction device D, and the diffraction device D may diffract the light incident thereon. Thereby, a plurality of views may be formed according to the grating patterns of the diffraction device D.

Figure 4:
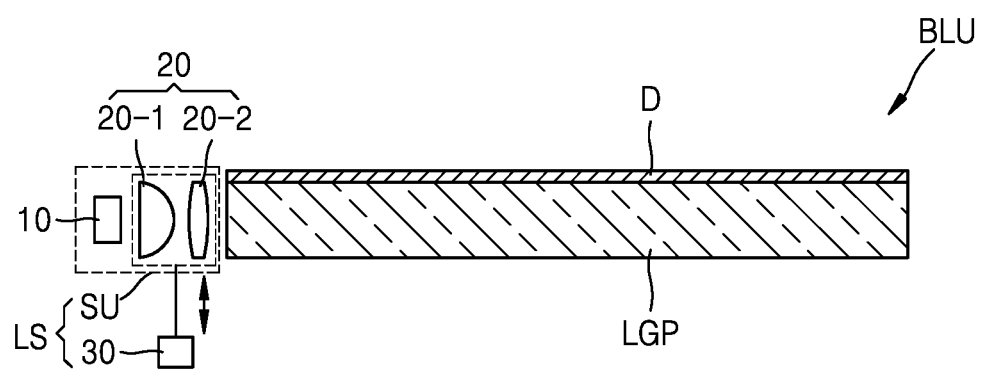
FIG. 4 illustrates an example in which the collimator of the backlight unit includes a plurality of lenses according to an exemplary embodiment.

FIG. 4 illustrates an example in which the collimator 20 includes a half ball lens 20-1 and a Fresnel lens 20-2. The collimator 20 may have any other configuration. Referring to FIG. 4, the collimator 20 may be mechanically moved by the actuator 30 to enable the lighting system LS to selectively transmit collimated light or diverging light.

Figure 5:
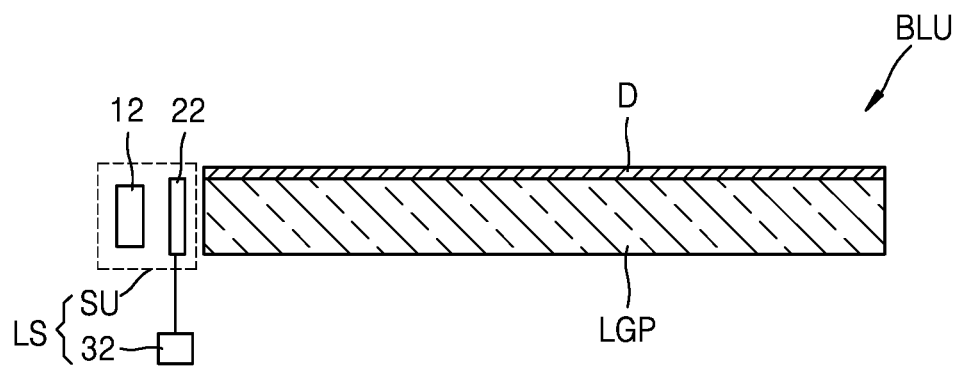
FIG. 5 illustrates an example in which the collimator of the backlight unit includes an active optical device according to an exemplary embodiment.

Referring to FIG. 5, the light source unit SU may include a light source 12 and an electrically controllable collimator 22. The collimator 22 may include an active optical device which is electrically deformable or variable. For example, the collimator 22 may include a liquid crystal layer or an electrowetting device. An optical switch 32 may be used to electrically turn on or off the collimator 22.

Figure 6:
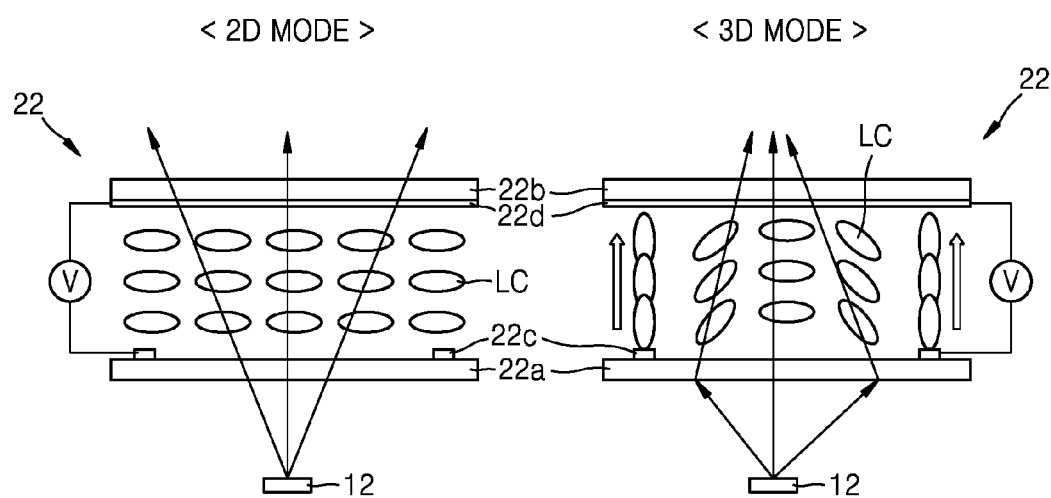
FIG. 6 illustrates an operation of the backlight unit depicted in FIG. 5.

FIG. 6 illustrates an example in which the collimator 22 includes a liquid crystal layer. The collimator 22 may include first and second substrates 22a and 22b facing each other, first electrodes 22c on the first substrate 22a, and a second electrode 22d on the second substrate 22b. A liquid crystal layer LC may be provided between the first and second substrates 22a and 22b. For example, the collimator 22 may include an array in which structures such as the structure illustrated in FIG. 6 are arranged in a matrix format. However, the number or arrangement of such structures of the collimator 22 may be varied. For example, the first and second substrates 22a and 22b may be transparent glass substrates. The first and second electrodes 22c and 22d may be transparent electrodes. The first electrodes 22c may be independent electrodes having a strip shape, and the second electrode 22d may be a common electrode.

If the optical switch 32 does not apply a voltage between the first and second electrodes 22c and 22d, the liquid crystal layer LC may transmit diverging light emitted from the light source 12 without collimating the light from the light source 12. In this case, the optical switch 32 may be a liquid crystal driving switch used for on-off control of voltage to the liquid crystal layer LC. If the optical switch 32 does not apply a voltage to the liquid crystal layer LC, the diverging light incident on the light guide plate LGP and transmitted through the diffraction device D does not provide a plurality of views but provides the same view to both eyes of a viewer, and thus 2D images may be displayed (2D mode). If the optical switch 32 applies a voltage to the liquid crystal layer LC, the liquid crystal layer LC may deform to form a lens. Then, light may be collimated by the liquid crystal layer LC functioning as a lens, and the collimated light may be diffracted by the diffraction device D. Thus, a plurality of views may be formed to create 3D images (3D mode).

An electrowetting device (not shown) may include first and second liquids, and the interface between the first and second liquids may be electrically varied. The shape of the interface between the first and second liquids is variable, and thus the electrowetting device may function as a lens or a transparent plate. In this case, the optical switch 32 may be an electrowetting device driving switch capable of performing an electric on-off control operation on the electrowetting device. When the electrowetting device is controlled to function as a lens, the collimator 22 may be in an on-state and collimate light coming from the light source 12, and when the electrowetting device functions as a transparent plate, the collimator 22 may be in an off-state and transmit diverging light which diverges on its path toward the light guide plate LGP.

Figure 7:
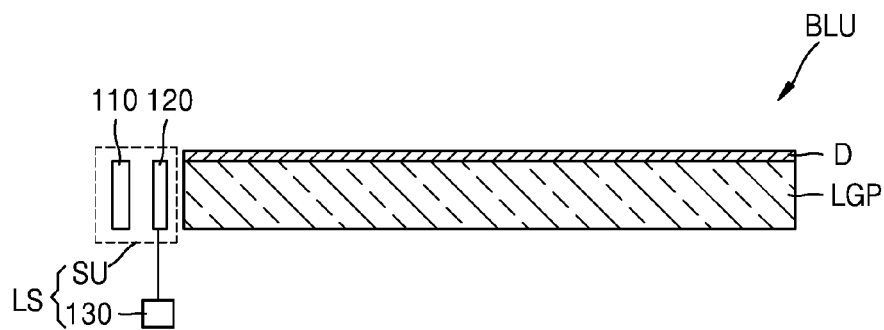
FIG. 7 illustrates an example in which the backlight unit includes a scatterer according to an exemplary embodiment.

The light source unit SU of the backlight unit BLU illustrated in FIG. 7 may include a light source 110 and a scatterer 120 configured to scatter light emitted from the light source 110. For example, the scatterer 120 may include polymer dispersed liquid crystals (PDLC). The light source 110 may emit collimated light. For example, the light source 110 may include a laser diode (LD). The scatterer 120 may scatter light emitted from the light source 110, and thus the light emitted from the scatterer may be disperse. In addition, an optical switch 130 may be used to turn on or off the scatterer 120. For example, the optical switch 130 may include an actuator capable of moving the scatterer 120. If the optical switch 130 aligns the scatterer 120 with an optical axis of the light source 110, light emitted from the light source 110 may be scattered by the scatterer 120 and may then be incident on the light guide plate LGP. In the light guide plate LGP, the scattered light may randomly strike the diffraction device D while undergoing total internal reflection, and may leave the diffraction device D without being diffracted.

If the optical switch 130 moves the scatterer 120 away from the optical axis, collimated light emitted from the light source 110 is incident on the light guide plate LGP. Then, the collimated light may undergo total internal reflection in the light guide plate LGP and may be incident on the diffraction device D as collimated light. Thus, the light may form a plurality of views owing to diffraction by the diffraction device D.

Figure 8:
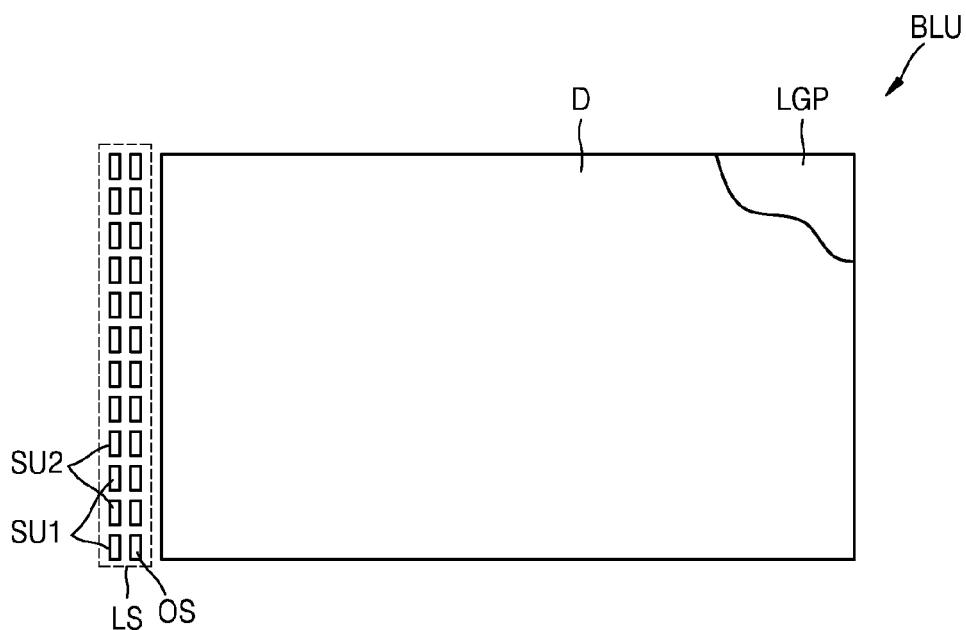
FIG. 8 schematically illustrates a backlight unit according to another exemplary embodiment.

FIG. 8 illustrates a backlight unit BLU according to another exemplary embodiment. The backlight unit BLU may include a lighting system LS emitting light, a light guide plate LGP guiding light emitted from the lighting system LS, and a diffraction device D diffracting or randomly outputting light coming from the light guide plate LGP. For example, the lighting system LS may be arranged along a lateral side of the light guide plate LGP.

The lighting system LS may include a plurality of light source units, and optical switches OS blocking or transmitting light emitted from one or more of the light source units.

For example, the light source units may have an array structure in which first light source units SU1 and second light source units SU2 are alternately arranged. For example, the first light source units SU1 may emit collimated light, and the second light source units SU2 may emit diverging light. The optical switches OS may perform an on-off control operation on the first and second light source units SU1 and SU2 so as to provide collimated light or diverging light to the light guide plate LGP. If collimated light is incident on the light guide plate LGP, the collimated light may be diffracted by the diffraction device D, and thus a plurality of views may be formed. If diverging light is incident on the light guide plate LGP, the diverging light may pass through the diffraction device D without diffraction, and thus the same illumination may be provided to the left and right eyes of a viewer.

Figure 9:
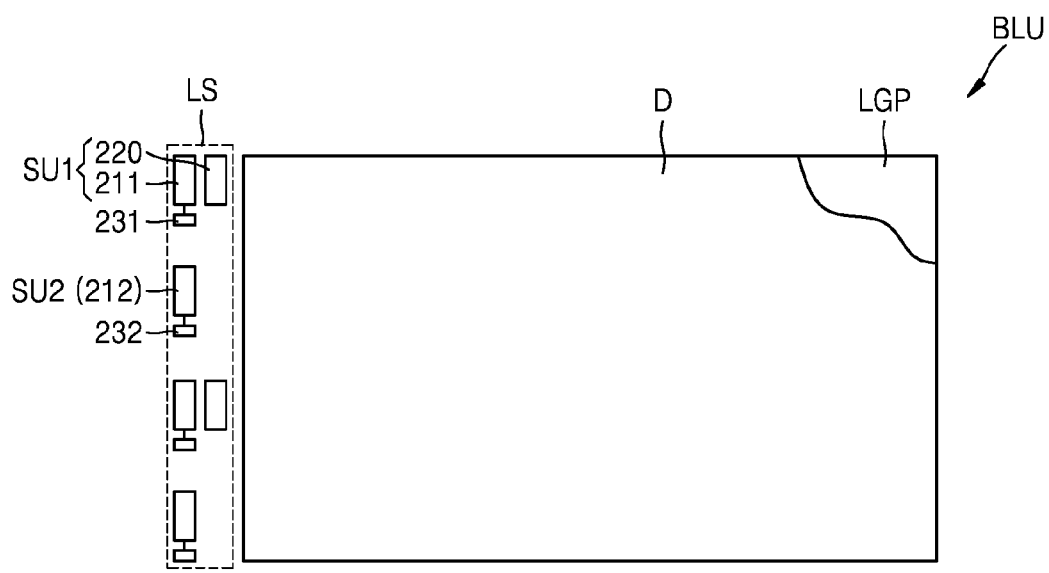
FIG. 9 illustrates an example of a lighting system of the backlight unit depicted in FIG. 8.

FIG. 9 illustrates an example of the backlight unit BLU including an array of a plurality of light source units.

The lighting system LS may have an array structure in which first light source units SU1 and second light source units SU2 are alternately arranged. For example, each of the first light source units SU1 may include a first light source 211 emitting diverging light, and a collimator 220 collimating the diverging light emitted from the first light source 211. For example, the first light source 211 may include an LED. A first optical switch 231 may electrically turn on or off the first light source 211. Each of the second light source units SU2 may include a second light source 212. For example, the second light source 212 may include an LED. A second optical switch 232 may electrically turn on or off the second light source 212.

When the first light source 211 is turned on and the second light source 212 is turned off, light emitted from the first light source 211 is collimated by the collimator 220 and is then incident on the light guide plate LGP. Thereafter, the light is diffracted by the diffraction device D, and thus a plurality of views may be formed to display 3D images. When the first light source 211 is turned off and the second light source 212 is turned on, diverging light emitted from the second light source 212 is incident on the light guide plate LGP and passes through the diffraction device D without diffraction. Thus, the light emitted from the diffraction device D may be used to display 2D images.

Figure 10:
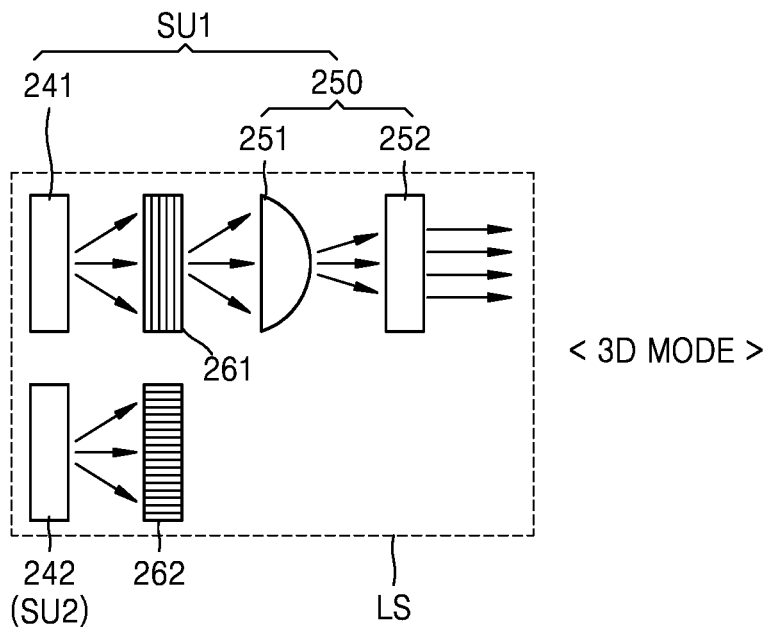
FIG. 10 illustrates another example of the lighting system of the backlight unit depicted in FIG. 8.
Figure 10:
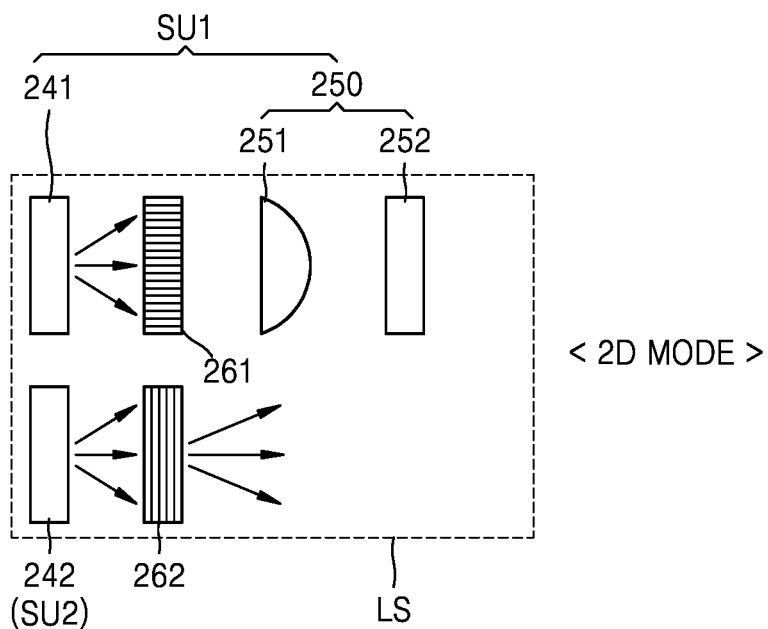

FIG. 10 illustrates another example of the lighting system LS having an array structure.

The lighting system LS may include first light source units SU1, first optical switches 261, second light source units SU2, and second optical switches 262. Each of the first light source units SU1 may include a first light source 241 and a collimator 250. Each of the second light source units SU2 may include a second light source 242. For example, the collimator 250 may include a half ball lens 251 and a Fresnel lens 252. The first light source units SU1 and the second light source units SU2 may be alternately arranged. In FIG. 10, only one set of the first light source unit SU1 and the second light source unit SU2 is illustrated for conciseness. The first light source 241 and the second light source 242 may each emit diverging light. For example, the first light source 241 and the second light source 242 may each include one or more LEDs.

For example, the first optical switch 261 and the second optical switch 262 may be liquid crystal driving switches. When the liquid crystal driving switches are turned on, light is transmitted through the liquid crystal driving switches, and when the liquid crystal driving switches are turned off, light is not transmitted through the liquid crystal driving switches. If the first and second light sources 241 and 242 are turned on, the first optical switch 261 is turned on, and the second optical switch 262 is turned off, diverging light emitted from the first light source 241 passes through the first optical switch 261 and is made to be collimated upon transmission through the collimator 250. Then, the light is incident on the light guide plate LGP (not shown). Light emitted from the second light source 242 is blocked by the second optical switch 262. In this manner, 3D images may be displayed. In FIG. 10, the first optical switch 261 is disposed between the first light source 241 and the collimator 250. In another example, however, the first optical switch 261 may be disposed on an optical path after the collimator 250.

If the first and second light sources 241 and 242 are turned on, the first optical switch 261 is turned off, and the second optical switch 262 is turned on, diverging light emitted from the first light source 241 is blocked by the first optical switch 261, and diverging light emitted from the second light source 242 is transmitted through the second optical switch 262 and is incident on the light guide plate LGP (not shown). In this manner, 2D images may be displayed in 2D mode.

Figure 11:
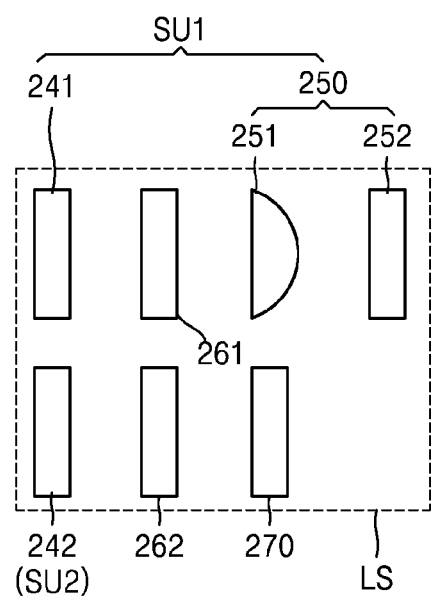
FIG. 11 illustrates an example in which the lighting system of the backlight unit depicted in FIG. 10 further includes a scatterer.

FIG. 11 illustrates an example in which the lighting system LS depicted in FIG. 10 further includes a scatterer.

The scatterer 270 may be disposed on an optical path after the second optical switch 262 or on an optical path between the second light source 242 and the second optical switch 262. In the 2D mode, the scatterer 270 scatters light emitted from the second light source 242. If the collimator 250 and the scatterer 270 are alternately arranged as shown in FIG. 11, light sources emitting diverging light or collimated light may be used as the first and second light sources 241 and 242.

Figure 12:
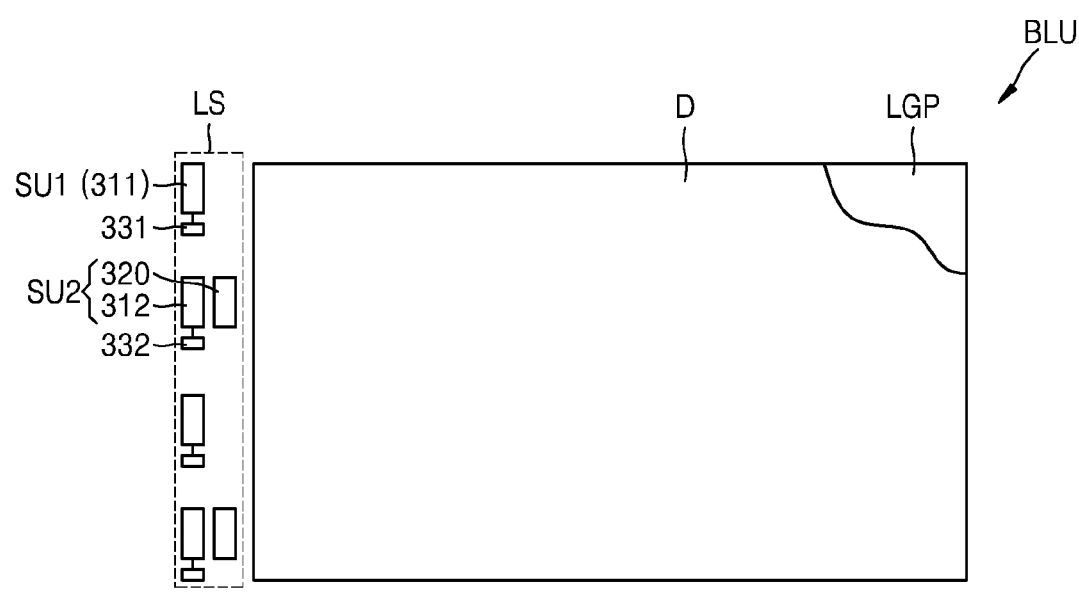
FIG. 12 illustrates another example of the lighting system of the backlight unit depicted in FIG. 8.

FIG. 12 illustrates another exemplary embodiment of the lighting system LS.

The lighting system LS may have an array structure in which first light source units SU1 and second light source units SU2 are alternately arranged. For example, each of the first light source unit SU1 may include a first light source 311 emitting collimated light. Each of the second light source units SU2 may include a second light source 312 emitting collimated light, and a scatterer 320 scattering the collimated light emitted from the second light source 312. For example, the first light source 311 and the second light source 312 may each include an LD. A first optical switch 331 may electrically turn on or off the first light source 311. A second optical switch 332 may electrically turn on or off the second light source 312.

When the first light source 311 is turned on and the second light source 312 is turned off, collimated light emitted from the first light source 311 is incident on the light guide plate LGP. Thereafter, the light is diffracted by the diffraction device D, and thus a plurality of views may be formed to display 3D images. When the first light source 311 is turned off and the second light source 312 is turned on, collimated light emitted from the second light source 312 is scattered by the scatterer 320 and is then be incident on the light guide plate LGP. In this case, since the light incident on the light guide plate LGP is diverging light, the light is transmitted through the diffraction device D without being diffracted. Therefore, the light emitted from the diffraction device D may be used to display 2D images.

Figure 13:
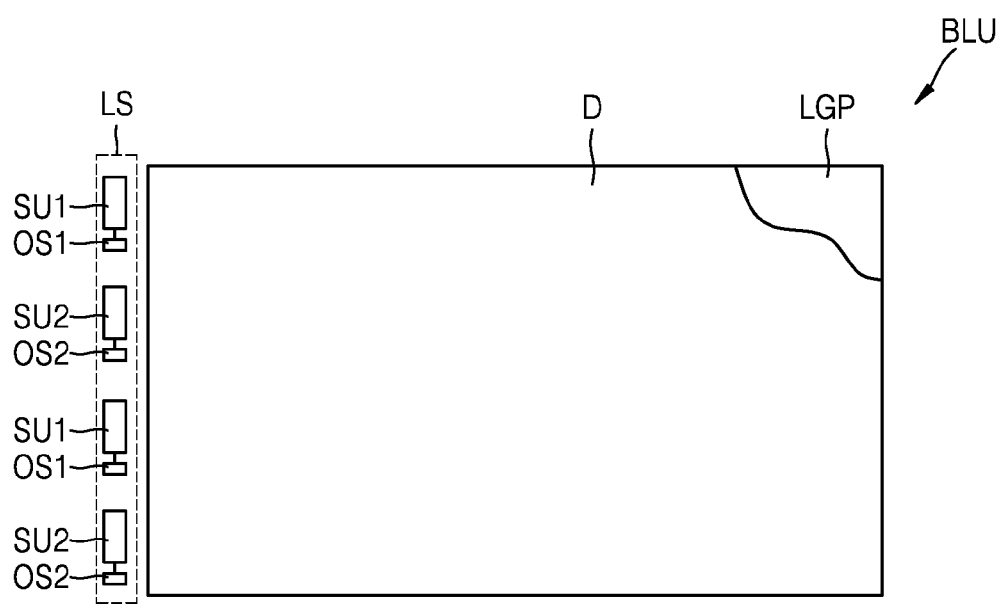
FIG. 13 illustrates another example of the lighting system of the backlight unit depicted in FIG. 8.

FIG. 13 illustrates another exemplary embodiment of the lighting system LS.

The lighting system LS may include first light source units SU1 emitting collimated light, first optical switches OS1 turning on or off the first light source units SU1, second light source units SU2 emitting diverging light, and second optical switches OS2 turning on or off the second light source units SU2. For example, the first light source units SU1 may each include an LD, and the second light source units SU2 may each include an LED. For example, the first and second optical switches OS1 and OS2 may electrically turn on or off the first and second light source units SU1 and SU2, respectively. The first and second light source units SU1 and SU2 may be alternately arranged.

When the first light source units SU1 are turned on and the second light source units SU2 are turned off, collimated light emitted from the first light source units SU1 is incident on the light guide plate LGP and is diffracted by the diffraction device D, and thus a plurality of views may be formed to display 3D images using the light emitted from the diffraction device D. When the first light source units SU1 are turned off and the second light source units SU2 are turned on, diverging light emitted from the second light source units SU2 is incident on the light guide plate LGP and is transmitted through the diffraction device D without being diffracted. Therefore, the light emitted from the diffraction device may be used to display 2D images.

Figure 14:
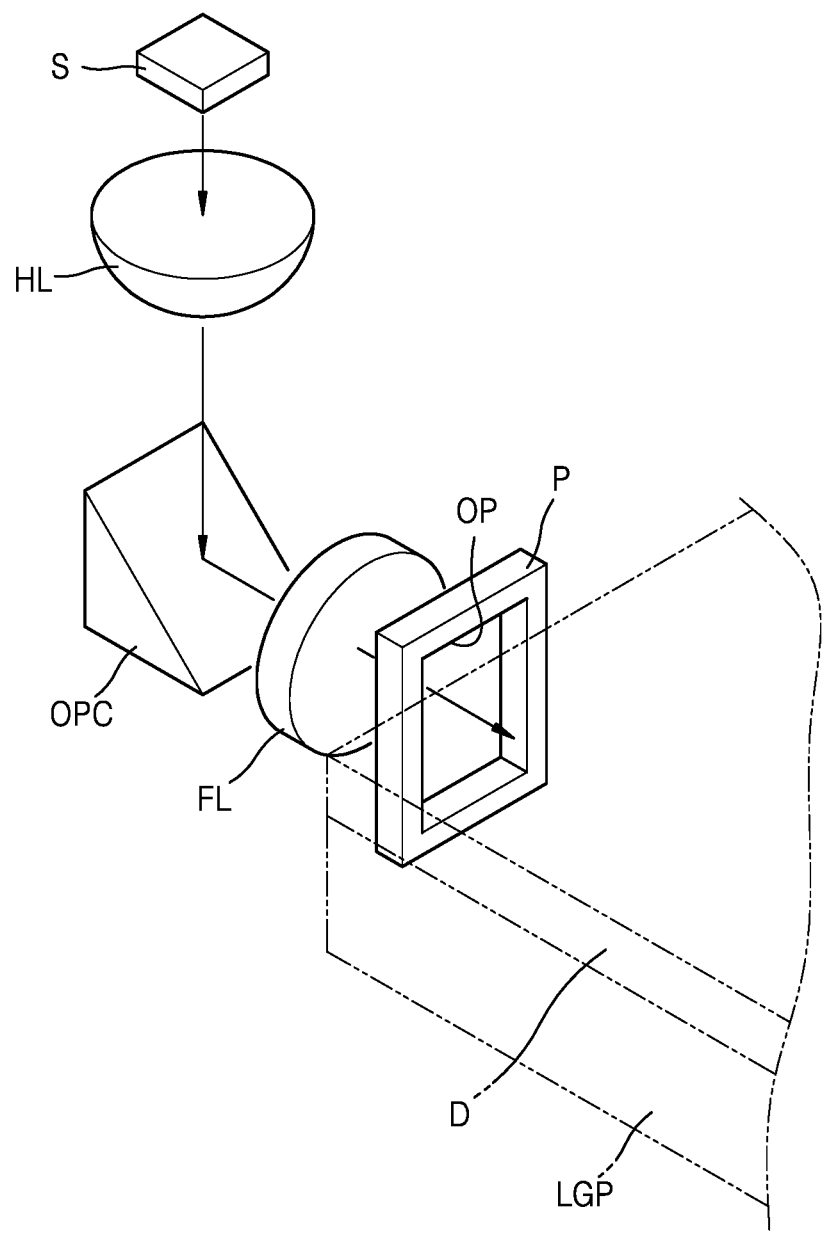
FIG. 14 illustrates an exemplary arrangement of a lighting system of a backlight unit according to an exemplary embodiment.

FIG. 14 illustrates an example in which the array structure of the lighting system LS is modified. In this example, the lighting system LS may include a light source S and a collimator comprising a half ball lens HL and a Fresnel lens FL. In addition, an optical path changer OPC such as a mirror or a prism may be disposed between the half ball lens HL and the Fresnel lens FL. Owing to the optical path changer OPC, the space between the light source S and the light guide plate LGP may be used in various manners. For example, the light source S, the half ball lens HL, the optical path changer OPC, and the Fresnel lens FL may be arranged to form an L-shaped or a reverse L-shaped optical path between the light source S and the light guide plate LGP. In the example illustrated in FIG. 14, the optical path changer OPC is disposed between the half ball lens HL and the Fresnel lens FL. However, the optical path changer OPC may be disposed between the light source S and the half ball lens HL or between the Fresnel lens FL and the light guide plate LGP. Instead of the half ball lens HL and the Fresnel lens FL, any other collimator may be used. The space lateral to a side of the light guide plate LGP may be efficiently used due to the use of the optical path changer OPC. An optical plate P having an opening OP may be disposed between the Fresnel lens FL and the light guide plate LGP to adjust the amount of light transmitted to the light guide plate LGP. The opening OP may be used for adjusting the cross-sectional shape of a light beam incident on the light guide plate LGP as well as adjusting the amount of light incident on the light guide plate LGP.

Figure 15:
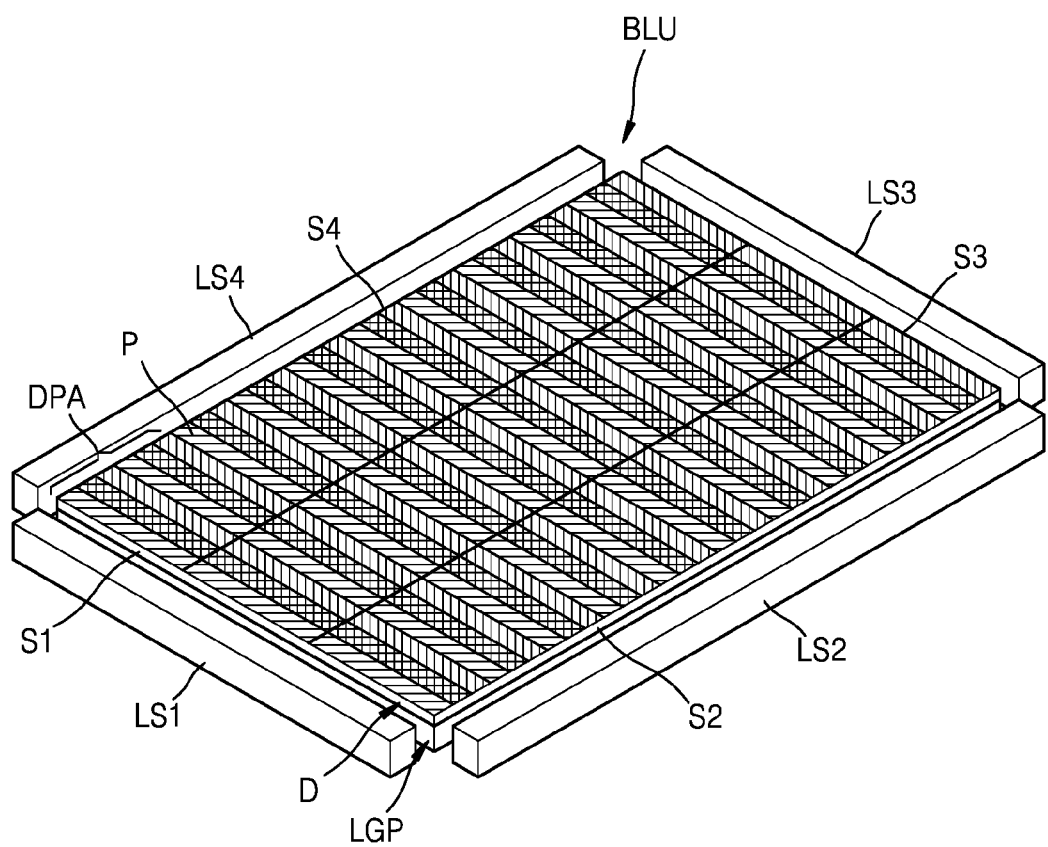
FIG. 15 illustrates lighting systems arranged along a plurality of sides of a light guide plate according to an exemplary embodiment.

FIG. 15 illustrates a backlight unit BLU including light sources emitting light having at least two wavelengths. For example, the backlight unit BLU may include a plurality of lighting systems emitting light having two or more wavelengths, a light guide plate LGP, and a diffraction device D disposed on the light guide plate LGP. For example, the lighting systems may include a first lighting system LS1 emitting light having a first wavelength, a second lighting system LS2 emitting light having a second wavelength, and a third lighting system LS3 emitting light having a third wavelength. The first lighting system LS1 may be adjacent to a first lateral side S1 of the light guide plate LGP, the second lighting system LS2 may be adjacent to a second lateral side S2 of the light guide plate LGP, and the third lighting system LS3 may be adjacent to a third lateral side S3 of the light guide plate LGP. For example, the first lighting system LS1 may emit blue light, the second lighting system LS2 may emit red light, and the third lighting system LS3 may emit green light. For example, red light may have a full width at half maximum (FWHM) of about 17 nm or less, green light may have an FWHM of about 33 nm or less, and blue light may have an FWHM of about 15 nm or less. The above-mentioned FWHM values are exemplary values, and the inventive concept is not limited thereto.

Light emitted from each of the first, second, and third lighting systems LS1, LS2, and LS3 may be incident on the light guide plate LGP at a predetermined angle of incidence, and the diffraction direction of the light may be determined according to the angle of incidence and the wavelength of the light and the grating patterns of the diffraction device D.

The diffraction device D may include diffraction pattern areas DPA corresponding to a plurality of views. Each of the diffraction pattern areas DPA may have diffraction patterns P corresponding to the different colors of light incident thereon. For example, when images having twenty views are displayed, twenty diffraction pattern areas DPA may be used, and each of the diffraction pattern areas DPA may include a plurality of patterns P corresponding to a plurality of colors.

If collimated color light is incident on different sides of the light guide plate LGP, the direction in which the light is emitted from the diffraction device D may be controlled by the diffraction device D, and thus 3D images may be displayed. If diverging color light is incident on the light guide plate LGP, the direction in which the light is emitted from the diffraction device D may be random, and thus 2D color images may be displayed.

A fourth lighting system LS4 may be further disposed in a position adjacent to a fourth side S4 of the light guide plate LGP. For example, the fourth lighting system LS4 may emit green light. Since the optical efficiency of green light is lower than the optical efficiency of blue light and the optical efficiency of red light, a relatively large amount of green light may be emitted so as to adjust color balance. However, the method of configuring lighting systems according to colors is not limited to the above-described configuration. That is, the method may be variously modified. The exemplary lighting systems described with reference to FIGS. 1 to 14 may be applied to the first to fourth lighting systems LS1 to LS4 illustrated in FIG. 15, and this will not be described in detail.

Figure 16:
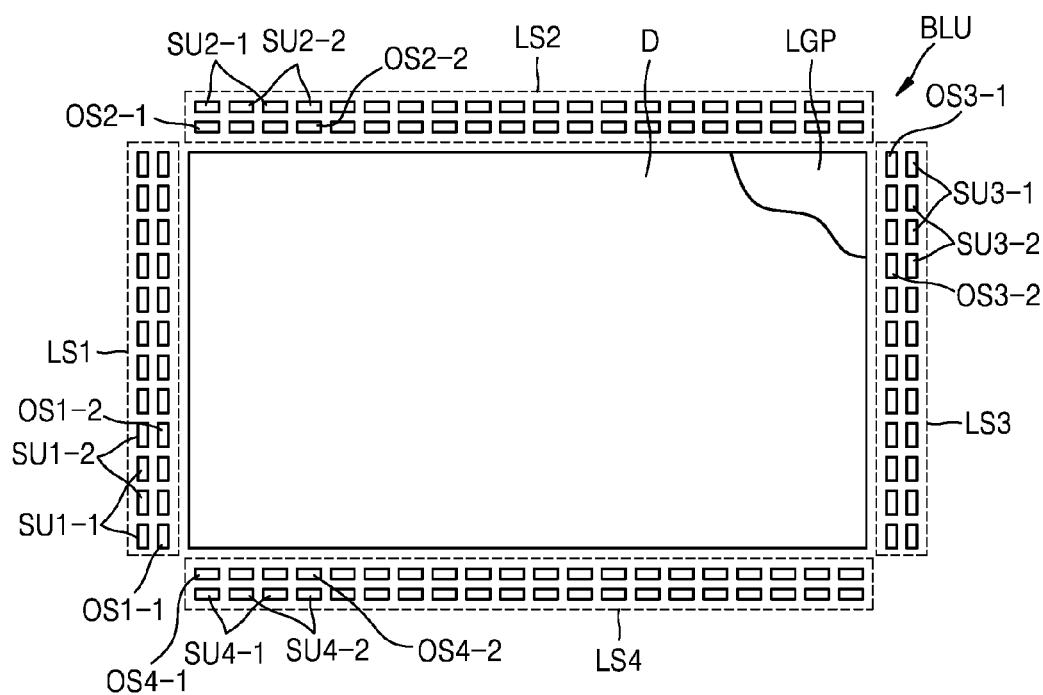
FIG. 16 illustrates an example of a backlight unit depicted in FIG. 15.

FIG. 16 illustrates another example of a backlight unit BLU including light sources emitting light having at least two wavelengths. Referring to FIG. 16, the backlight unit BLU may include a plurality of lighting systems, a light guide plate LGP guiding light emitted from the lighting systems, and a diffraction device D. For example, the plurality of lighting systems may include a first lighting system LS1 adjacent to a first lateral side of the light guide plate LGP, a second lighting system LS2 adjacent to a second lateral side of the light guide plate LGP, a third lighting system LS3 adjacent to a third lateral side of the light guide plate LGP, and a fourth lighting system LS4 adjacent to a fourth lateral side of the light guide plate LGP. The first lighting system LS1 may include light source units SU1-1 and light source units SU1-2 alternately arranged, optical switches OS1-1 turning on or off the light source units SU1-1, and optical switches OS2-1 turning on or off the light source units SU1-2. Each of the light source units SU1-1 may emit collimated light having a first color, such as blue. Here, the collimated light having the first color may be light emitted from a light source capable of emitting collimated light or may be light collimated by a collimator. In the former case, the light source may be an LD. In the latter case, the collimator may be substantially the same as those described with reference to FIGS. 1 and 11, and thus a detailed description thereof will not be presented here.

The light source units SU1-2, on the other hand, may include light sources emitting dispersed white light. The optical switches OS1-1 and the optical switches OS1-2 are substantially the same as those described with reference to FIGS. 1 to 13, and thus detailed descriptions thereof will not be repeated here.

The second lighting system LS2 may include light source units SU2-1 and light source units SU2-2 alternately arranged, optical switches OS2-1 turning on or off the light source units SU2-1, and optical switches OS2-2 turning on or off the light source units SU2-2. Each of the light source units SU2-1 may emit collimated light having a second color, such as red. Here, the collimated light having the second color may be light emitted from a light source capable of emitting collimated light or may be light collimated by a collimator. The light source units SU2-2, on the other hand, may include light sources emitting dispersed white light.

The third lighting system LS3 may include light source units SU3-1 and light source units SU3-2 alternately arranged, optical switches OS3-1 turning on or off the light source units SU3-1, and optical switches OS3-2 turning on or off the light source units SU3-2. Each of the light source units SU3-1 may emit collimated light having a third color, such as green. Here, the collimated light having the third color may be light emitted from a light source capable of emitting collimated light or may be light collimated by a collimator. The light source units SU3-2, on the other hand, may include light sources emitting dispersed white light.

The fourth lighting system LS4 may include light source units SU4-1 and light source units SU4-2 alternately arranged, optical switches OS4-1 turning on or off the light source units SU4-1, and optical switches OS4-2 turning on or off the light source units SU4-2. Each of the light source units SU4-1 may emit collimated light having the third color, such as green. Here, the collimated light having the third color may be light emitted from a light source capable of emitting collimated light or may be light collimated by a collimator. The light source units SU4-2, on the other hand, may include light sources emitting dispersed white light.

When the light source units SU1-1, the light source units SU2-1, the light source units SU3-1, and the light source units SU4-1 are turned on, and the light source units SU1-2, the light source units SU2-2, the light source units SU3-2, and the light source units SU4-2 are turned off, collimated color light is incident on the diffraction device D, via the light guide plate LGP, and thus the direction of the color light emitted by the diffraction device D may be adjusted. In this manner, light for displaying multi-view 3D color images may be provided.

When the light source units SU1-1, the light source units SU2-1, the light source units SU3-1, and the light source units SU4-1 are turned off, and the light source units SU1-2, the light source units SU2-2, the light source units SU3-2, and the light source units SU4-2 are turned on, dispersed white light is transmitted through the light guide plate LGP and the diffraction device D, and thus light for displaying 2D images may be provided.

In the example illustrated in FIG. 16, the light source units SU1-1 and the light source units SU1-2 are alternately arranged. However, the numbers and arrangement of the light source units SU1-1 and SU2-1 may be varied. For example, sets each including two light source units SU1-1 and one light source units SU1-2 may be arranged. The other light source units may be arranged in the same manner.

Figure 17:
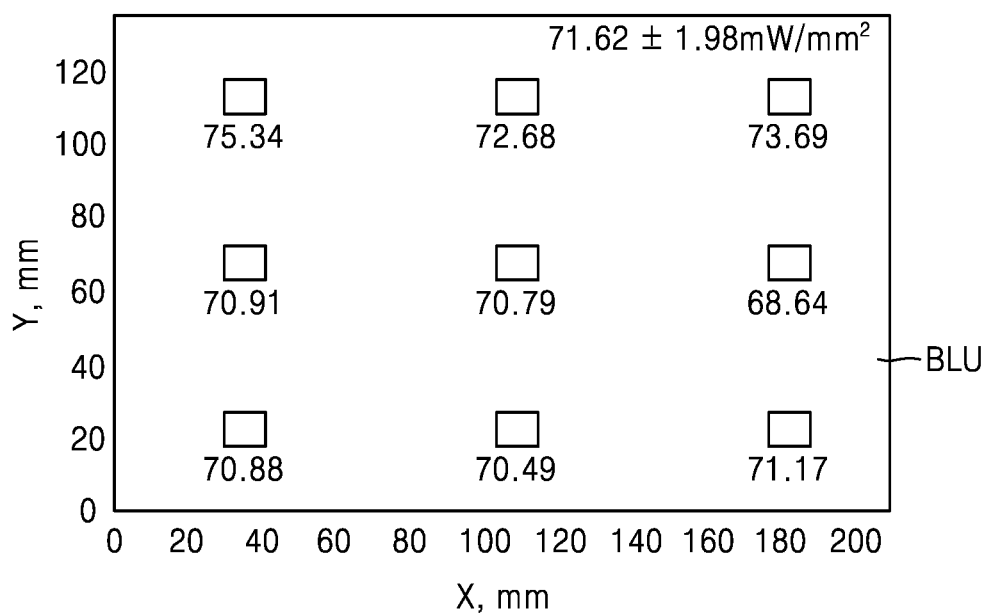
FIG. 17 illustrates simulation results on the uniformity of light intensity of the backlight unit depicted in FIG. 16 when a collimator of the backlight unit is turned off and the backlight unit is operated in 2D mode.
Figure 18:
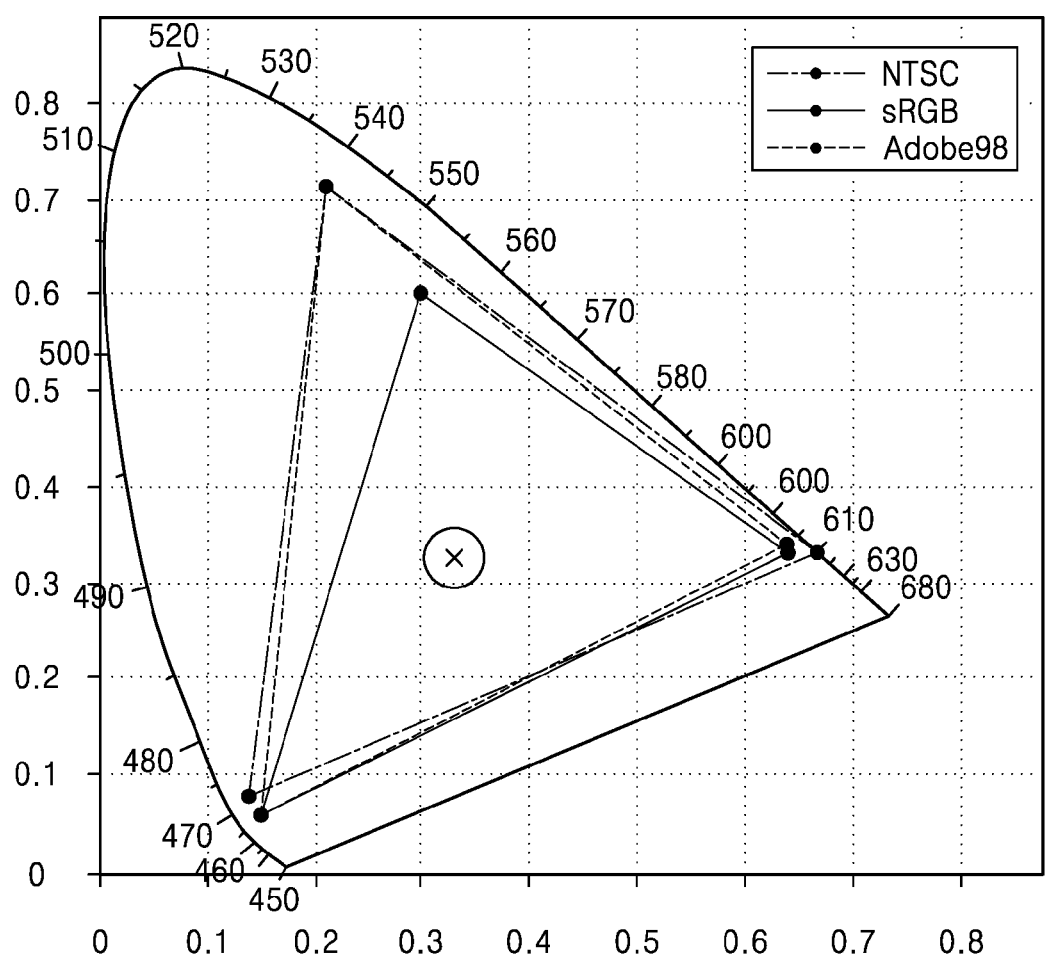
FIG. 18 illustrates color coordinates when the collimator of the backlight unit depicted in FIG. 16 is turned off and the backlight unit is operated in 2D mode.

A light intensity uniformity and white balance may be affected by the diffraction device D when collimated light is off and 2D image is displayed, while the light intensity uniformity and white balance may not be affected by the diffraction device D when collimated light is on and 3D image is displayed. FIG. 17 illustrates results of a simulation performed to evaluate light intensity uniformity when collimated light is off and diverging light (white light) is on. In FIG. 17, the x-axis denotes a horizontal direction in a plan view of the backlight unit BLU, and the y-axis denotes a longitudinal direction in the plan view of the backlight unit BLU. The light intensity has an average value of 71.62 Mw/mm$^2$ with a deviation of ±1.98 Mw/mm$^2$, and the uniformity of light intensity is about 91%. It shows that the uniformity of light intensity does not deteriorate during displaying 2D images. FIG. 18 illustrates color coordinates in the same conditions. NTSC (National Television System Committee), sRGB, and Adobe 98 may be generally used as the color coordinates. FIG. 18 shows that white light is distributed in a range of about 0.3±0.10 at white coordinates (0.3, 0.3), meaning a good white balance during displaying 2D images.

Figure 19:
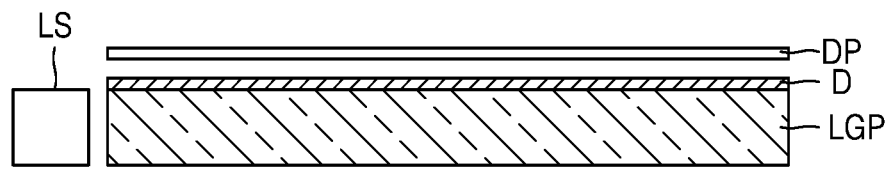
FIG. 19 schematically illustrates a 3D image display apparatus including a backlight unit according to an exemplary embodiment.

FIG. 19 schematically illustrates a 3D image display apparatus according to an exemplary embodiment. The 3D image display apparatus may include a lighting system LS, a light guide plate LGP guiding light emitted from the lighting system LS, a diffraction device D provided on the light guide plate LGP, and a display panel DP displaying images. The lighting system LS, the light guide plate LGP, and the diffraction device D are substantially the same as those illustrated with reference to FIGS. 1 to 16, and thus detailed descriptions thereof will not be presented here. The display panel DP may include a liquid crystal display. For example, the display panel DP may include a plurality of pixels arranged in a matrix form, and each of the pixels may include sub-pixels corresponding to a plurality of views. Here, the term "view" may refer to an image provided to one eye of a viewer. For example, if twenty views are formed, each pixel may include twenty sub-pixels, and the diffraction device D may include twenty grating patterns corresponding to the twenty views, respectively.

If the display panel DP is capable of displaying color images, each of the sub-pixels may include color sub-pixels corresponding to colors. For example, each sub-pixel may include a blue sub-pixel, a red sub-pixel, and a green sub-pixel.

The lighting system LS may selectively emit collimated light and diverging light. The diffraction device D may adjust the direction in which collimated light is emitted from the diffraction device D to the display panel DP according to at least one of the angle of incidence of the collimated light on the light guide plate LGP and the wavelength of the collimated light, and thus 3D images may be displayed. In addition, the diffraction device D may transmit diverging light without adjusting the direction of the diverging light, and thus 2D images may be displayed. As described above, although the 3D image display apparatus of this exemplary embodiment has a backlight unit equipped with only one light guide plate LGP, the 3D image display apparatus is capable of switching between 2D image display mode and 3D image display mode.

Figure 20:
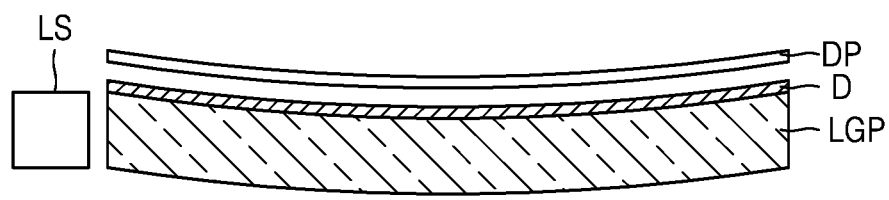
FIG. 20 schematically illustrates a 3D image display apparatus including a curved backlight unit according to an exemplary embodiment.

Referring to FIG. 20, a 3D image display apparatus having a curved shape may be manufactured. For example, a light guide plate LGP, a diffraction device D, and a display panel DP having curved shapes may be manufactured to display images more naturally.

Figure 21:
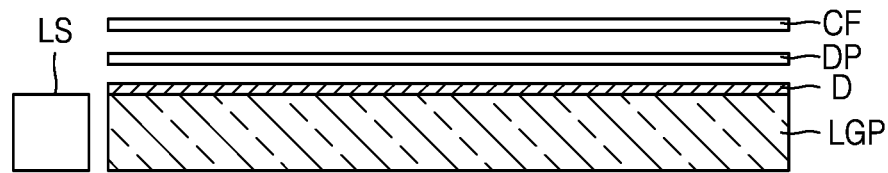
FIG. 21 illustrates an example in which the 3D image display apparatus depicted in FIG. 19 further includes a color filter.

FIG. 21 illustrates a 3D image display apparatus further including a color filter CF, as compared to the 3D image display apparatus illustrated in FIG. 19. The color filter CF may be disposed facing a light output side of a display panel DP. The display panel DP may display a grayscale image, and the color filter CF may express colors, so as to display 3D color images or 2D color images.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A lighting system comprising:
light sources configured to emit one or both of diverging light and collimated light; and
optical switches configured to selectively output diverging light and collimated light;
wherein the optical switches comprise at least one of:
liquid crystal collimators configured to change diverging light into collimated light;
an actuator configured to move an optical element to and away from an optical axis of the light source.

2. The lighting system of claim 1, wherein at least some of the light sources are configured to emit diverging light and the optical switches comprise the liquid crystal collimators.

3. The lighting system of claim 2, wherein the light sources are light emitting diodes.

4. The lighting system of claim 2, wherein the collimators comprise a lens.

5. The lighting system of claim 2, wherein the optical switches further comprise the actuator configured to move the collimators to and away from the optical axis of the light source.

6. The lighting system of claim 1, wherein the light sources includes first light sources configured to emit the diverging light and second light sources configured to emit the collimated light.

7. The lighting system of claim 6, wherein the first light sources are light emitting diodes and the second light sources are laser diodes.

8. The lighting system of claim 6, wherein the first and second light sources are alternately arranged.

9. The lighting system of claim 6, wherein the optical switches are configured to perform on-off control operation on the first and second light sources.

10. A lighting system comprising:
light sources configured to emit one or both of diverging light and collimated light; and
optical switches configured to selectively output diverging light and collimated light,
wherein at least some of the light sources are configured to emit collimated light and the lighting system further comprises scatterers configured to change the collimated light emitted from the light sources into diverging light and the optical switches comprise an actuator configured to move the scatterer to and away from an optical axis of the light source.

11. The lighting system of claim 10, wherein the light sources are a laser diode.

12. The lighting system of claim 10, wherein the scatterers comprise a polymer dispersed liquid crystal.

13. A backlight unit comprising:
a lighting system configured to selectively output collimated light and diverging light;
a diffraction device; and
a light guide plate configured to guide the collimated light and the diverging light from the lighting system to the diffraction device;
wherein the collimated light is one of blue, red, and green light and the diverging light is white light.

14. The backlight unit of claim 13, wherein the lighting system is positioned lateral to a side of the light guide plate.

15. The backlight unit of claim 13, wherein the backlight unit includes a plurality of the lighting systems each being positioned lateral to a different side surface of the light guide plate.

16. The backlight unit of claim 15, wherein the collimated light selectively outputted from two of the plurality of lighting system is the green light.

17. A backlight unit comprising:
a lighting system configured to selectively output collimated light and diverging light;
a diffraction device; and
a light guide plate configured to guide the collimated light and the diverging light from the lighting system to the diffraction device,
wherein the lighting system includes:
a light source configured to emit the diverging light;
a collimator configured to change the diverging light from the light source into the collimated light; and
an optical switch configured to selectively output the collimated light and the diverging light to the light guide plate.

18. The backlight unit of claim 17, wherein the light source is a light emitting diode.

19. The backlight unit of claim 17, wherein the collimator comprises a lens.

20. The backlight unit of claim 17, wherein the collimator comprises a liquid crystal.

21. The backlight unit of claim 17, wherein the collimator comprises an eletrowetting device.

22. The backlight unit of claim 17, wherein the optical switch comprises an actuator configured to move the collimator to and away from an optical axis of the light source.

23. The backlight unit of claim 17, wherein the collimator comprises an electrically operable active optical device and the optical switch comprises a switch configured to electrically control the collimator.

24. A backlight unit comprising:
a lighting system configured to selectively output collimated light and diverging light;
a diffraction device; and
a light guide plate configured to guide the collimated light and the diverging light from the lighting system to the diffraction device,
wherein the lighting system includes:
a light source configured to emit the collimated light;
a scatterer configured to change the collimated light from the light source into the diverging light; and
an optical switch configured to selectively output the collimated light and the diverging light to the light guide plate.

25. The backlight unit of claim 24, wherein the light source is a laser diode.

26. The backlight unit of claim 24, wherein the scatterer comprises a polymer dispersed liquid crystal.

27. The backlight unit of claim 24, wherein the optical switch comprises an actuator configured to move the scatterer to and away from an optical axis of the light source.

28. A backlight unit comprising:
a lighting system configured to selectively output collimated light and diverging light;
a diffraction device; and
a light guide plate configured to guide the collimated light and the diverging light from the lighting system to the diffraction device,
wherein the lighting system includes:
a first light source configured to emit the diverging light;
a second light source configured to emit the collimated light; and
one or more optical switches configured to selectively output the collimated light and diverging light to the light guide plate.

29. The backlight unit of claim 28, wherein the first light source is a light emitting diode and the second light source is a laser diode.

30. The backlight unit of claim 28, wherein the lighting systems includes a plurality of the first light sources and a plurality of the second light sources.

31. The backlight unit of claim 30, wherein the first and second light sources are alternately arranged.

32. The backlight unit of claim 28, wherein the one or more optical switches are configured to perform on-off control operation on the first and second light sources.

33. A display apparatus comprising:
a lighting system configured to selectively output collimated light and diverging light;
a light guide plate configured to guide the collimated light and the diverging light from the lighting system;
a diffraction device configured to transmit the diverging light incident thereon from the light guide plate and to transmit the collimated light incident thereon from the light guide plate in an exit direction, the exit direction being depend on at least one of a wavelength and an angle of incidence of the collimated light from the light guide plate; and
a display panel configured to form images using the light transmitted from the diffraction device.

34. The display apparatus of claim 33, wherein the collimated light is one of blue, red, and green light and the diverging light is white light.

35. The display apparatus of claim 33, wherein the lighting system includes:
a light source configured to emit the diverging light;
a collimator configured to change the diverging light from the light source into the collimated light; and an optical switch configured to selectively output the collimated light and the diverging light to the light guide plate.

36. The display apparatus of claim 35, wherein the light source is a light emitting diode.

37. The display apparatus of claim 35, wherein the collimator comprises a lens.

38. The display apparatus of claim 35, wherein the collimator comprises a liquid crystal.

39. The display apparatus of claim 35, wherein the collimator comprises an eletrowetting device.

40. The display apparatus of claim 33, wherein the lighting system includes:
   a light source configured to emit the collimated light;
   a scatterer configured to change the collimated light from the light source into the diverging light; and
   an optical switch configured to selectively output the collimated light and the diverging light to the light guide plate.

41. The display apparatus of claim 40, wherein the light source is a laser diode.

42. The display apparatus of claim 33, wherein the lighting system includes:
   a first light source configured to emit the diverging light;
   a second light source configured to emit the collimated light; and
   one or more optical switches configured to selectively output the collimated light and diverging light to the light guide plate.

43. The display apparatus of claim 42, wherein the first light source is a light emitting diode and the second light source is a laser diode.

* * * * *